US011769631B2

(12) United States Patent
Jung et al.

(10) Patent No.: US 11,769,631 B2
(45) Date of Patent: Sep. 26, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: In Kyung Jung, Suwon-si (KR); Dong Hwi Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/592,840

(22) Filed: Feb. 4, 2022

(65) Prior Publication Data

US 2022/0157529 A1   May 19, 2022

Related U.S. Application Data

(63) Continuation of application No. 16/927,263, filed on Jul. 13, 2020, now Pat. No. 11,282,646.

(30) Foreign Application Priority Data

Sep. 2, 2019   (KR) .................. 10-2019-0108007

(51) Int. Cl.
   *H01G 4/232*   (2006.01)
   *H01G 4/12*   (2006.01)
(52) U.S. Cl.
   CPC ......... *H01G 4/2325* (2013.01); *H01G 4/1227* (2013.01)
(58) Field of Classification Search
   None
   See application file for complete search history.

(56) References Cited

U.S. PATENT DOCUMENTS

2010/0008017 A1*  1/2010  Ito .................. H01G 4/30
                                                361/301.4
2012/0320493 A1   12/2012  Lee et al.
(Continued)

FOREIGN PATENT DOCUMENTS

CN     104103424 A  * 10/2014  ............... H01G 4/01
CN     104867673 A     8/2015
(Continued)

OTHER PUBLICATIONS

Chinese Office Action dated Jul. 25, 2022, issued in corresponding Chinese Patent Application No. 202010885174.6.
(Continued)

*Primary Examiner* — Timothy J. Dole
*Assistant Examiner* — Muhammed Azam
(74) *Attorney, Agent, or Firm* — MORGAN, LEWIS & BOCKIUS LLP

(57) ABSTRACT

A multilayer ceramic electronic component includes a ceramic body; and first and second external electrodes disposed on the ceramic body, wherein the first and second external electrodes include first and second conductive layers disposed on corners of the ceramic body, and first and second base electrodes covering the first and second conductive layers, respectively, and wherein a ratio, $A_1/A_2$, of an area, $A_1$, of the first conductive layer disposed on the fifth surface or the second conductive layer disposed on the sixth surface of the ceramic body to an area, $A_2$, of a cross-sectional surface of the ceramic body taken in the second direction and the first direction is in a range of 0.1 to 0.3.

20 Claims, 9 Drawing Sheets

(56) References Cited

U.S. PATENT DOCUMENTS

| | | | |
|---|---|---|---|
| 2014/0116766 A1* | 5/2014 | Jeon | H05K 3/3442 |
| | | | 361/321.2 |
| 2014/0254064 A1 | 9/2014 | Miyazaki | |
| 2015/0243439 A1 | 8/2015 | Kwag | |
| 2015/0325373 A1* | 11/2015 | Satou | H01G 4/01 |
| | | | 361/301.4 |
| 2018/0174753 A1 | 6/2018 | Terashita et al. | |
| 2019/0066923 A1 | 2/2019 | Jung et al. | |
| 2021/0020367 A1* | 1/2021 | Yun | H01G 4/232 |
| 2021/0065980 A1 | 3/2021 | Jung et al. | |

FOREIGN PATENT DOCUMENTS

| | | | |
|---|---|---|---|
| CN | 109461578 A | | 3/2019 |
| CN | 112447397 A | | 3/2021 |
| JP | 2004-103927 A1 | | 4/2004 |
| JP | 2014-197666 A | | 10/2014 |
| KR | 10-1548859 B1 | | 8/2015 |
| KR | 20190116177 A | * | 10/2019 |

OTHER PUBLICATIONS

Notice of Allowance issued in corresponding U.S. Appl. No. 16/927,263 dated Nov. 12, 2021.

* cited by examiner

MULTILAYER CERAMIC ELECTRONIC COMPONENT

CROSS-REFERENCE TO RELATED APPLICATION(S)

The present application is the continuation application of U.S. patent application Ser. No. 16/927,263 filed Jul. 13, 2020, which claims the benefit of priority to Korean Patent Application No. 10-2019-0108007 filed on Sep. 2, 2019 in the Korean Intellectual Property Office, the disclosures of which are incorporated herein by reference in their entirety.

TECHNICAL FIELD

The present disclosure relates to a multilayer ceramic electronic component.

BACKGROUND

With the trend for reducing the sizes of electronic products, a multilayer ceramic electronic component has been required to have a reduced size and increased capacitance.

In accordance with the demand for a reduced size and increased capacity of a multilayer ceramic electronic component, an external electrode of a multilayer ceramic electronic component has also been designed to have a reduced thickness.

To form an external electrode, a paste for an external electrode may be prepared by mixing a general conductive metal with glass, a base resin, an organic solvent, and the like, and the paste for an external electrode may be applied to both surfaces of a ceramic body, and a metal may be sintered in the external electrode by baking-out the ceramic body.

The paste for an external electrode may guarantee chip-sealing properties and electrical connectivity with a chip using a conductive metal as a main material, and using glass as an auxiliary material, the paste may fill an empty space and may also provide cohesion force between an external electrode and a chip when the metal is sintered and reduced.

However, as a multilayer ceramic electronic component has been designed to have a reduced size and high capacitance, an increased number of layers of internal electrodes may be provided to secure capacitance, and accordingly, an upper cover layer may be designed to have a reduced thickness.

Accordingly, when an external electrode is formed, an internal electrode may be formed up to a region adjacent to a corner portion of a ceramic body having a reduced thickness such that the internal electrode may easily be exposed to physical and chemical impacts.

Also, as an external electrode of the multilayer ceramic electronic component has a reduced thickness, a thickness of an external electrode disposed adjacent to a corner portion of a ceramic body may further be reduced such that corner coverage performance may degrade and a plating solution may permeate through the corner.

In addition, in the case of an external electrode used in a high capacity type capacitor, a material which can be sintered at low temperature may be used to reduce heat impact when an external electrode is sintered. Particularly, glass softened at low temperature may be relatively vulnerable to acid resistance in a plating process. Due to the above-described properties, when a plating layer is formed externally of an external electrode, a plating solution may easily permeate into a ceramic body, which may reduce moisture resistance reliability and may degrade product quality.

SUMMARY

An aspect of the present disclosure is to provide a multilayer ceramic electronic component which may improve corner coverage performance of an external electrode to block a moisture permeation route such that moisture resistance reliability may improve and a band portion of an external electrode may have a reduced thickness.

According to an aspect of the present disclosure, a multilayer ceramic electronic component includes a capacitance forming portion including a dielectric layer and first and second internal electrodes stacked in a first direction with the dielectric layer interposed therebetween; a margin portion disposed on both surfaces of the capacitance forming portion in a second direction; a cover portion disposed on both surfaces of the capacitance forming portion in the first direction; a ceramic body having first and second surfaces opposing each other in the first direction, third and fourth surfaces opposing each other in the second direction, and fifth and sixth surfaces opposing each other in the third direction; and first and second external electrodes disposed on the fifth and sixth surfaces of the ceramic body, respectively, wherein the first and second external electrodes include first and second conductive layers disposed on corners of the ceramic body, and first and second base electrodes covering the first and second conductive layers, respectively, and wherein a ratio, $A_1/A_2$, of an area, $A_1$, of the first conductive layer disposed on the fifth surface or the second conductive layer disposed on the sixth surface of the ceramic body to an area, $A_2$, of a cross-sectional surface of the ceramic body taken in the second direction and the first direction is in a range of 0.1 to 0.3.

According to another aspect of the present disclosure, a multilayer ceramic electronic component includes a capacitance forming portion including a dielectric layer and first and second internal electrodes stacked in a first direction with the dielectric layer interposed therebetween; a ceramic body having first and second surfaces opposing each other in the first direction, third and fourth surfaces opposing each other in a second direction, and fifth and sixth surfaces opposing each other in a third direction; and first and second external electrodes disposed on the fifth and sixth surfaces of the ceramic body, respectively, wherein the first and second external electrodes respectively include first and second conductive layers disposed on the fifth and sixth surfaces and extending in the third direction onto the first to fourth surfaces, the first and second conductive layers each including an opening on the fifth surface or the sixth surface penetrating therethrough, wherein the first and second external electrodes further include first and second base electrodes covering the first and second conductive layers, and wherein a ratio, $A_1/A_2$, of an area, $A_1$, of the first conductive layer disposed on the fifth surface or the second conductive layer disposed on the sixth surface of the ceramic body to an area, $A_2$, of a cross-sectional surface of the ceramic body taken in the second direction and the first direction is in a range of 0.1 to 0.3.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
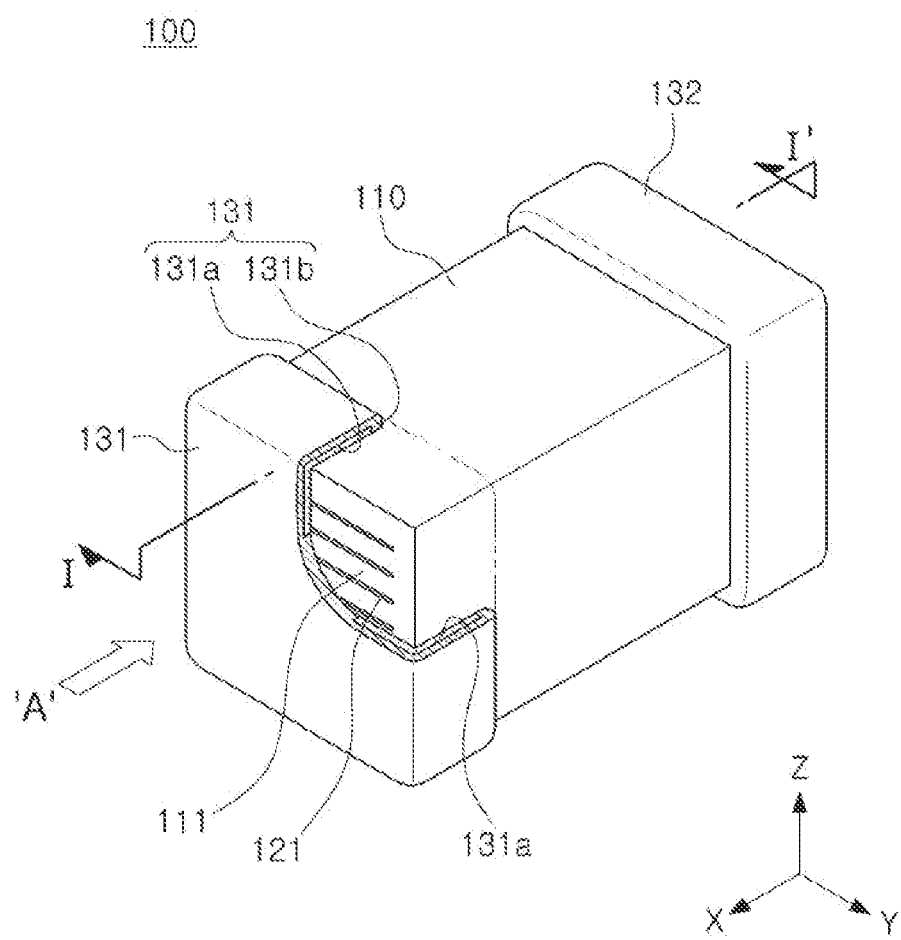
FIG. 1 is a perspective diagram illustrating a multilayer ceramic electronic component according to an exemplary embodiment of the present disclosure.

Hereinafter, embodiments of the present disclosure will be described as follows with reference to the attached drawings.

It should be understood that the following exemplifying description of the invention is not intended to restrict the invention to specific forms of the present invention but rather the present invention is meant to cover all modifications, similarities and alternatives which are included in the spirit and scope of the present invention. The same elements will be indicated by the same reference numerals.

For clarity of description, some elements may be omitted or briefly illustrated, and thicknesses of elements may be magnified to clearly represent layers and regions. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

In the diagram, an X direction may be defined as an L direction or a length direction, a Y direction may be defined as a W direction or a width direction, and a Z direction may be defined as a T direction or a thickness direction. The Z direction may also be defined as a first direction, the Y direction may also be defined as a second direction, and the X direction may also be defined as a third direction.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the description below, a multilayer ceramic electronic component will be described in accordance with an exemplary embodiment with reference to FIGS. 1 to 4.

Referring to FIGS. 1 to 4, a multilayer ceramic electronic component in the exemplary embodiment may include a capacitance forming portion $\alpha_W$ and $\alpha_T$ including a dielectric layer 111 and first and second internal electrodes 121 and 122 stacked in a first direction (Z direction) with the dielectric layer 111 interposed therebetween, a margin portion d disposed on each of both surfaces of the capacitance forming portion in the first direction, a cover portion c disposed on each of both surfaces of the capacitance forming portion, a ceramic body 110 having first and second surfaces S1 and S2 opposing each other in the first direction (Z direction), third and fourth surfaces S3 and S4 opposing each other in a second direction (Y direction), and fifth and sixth surfaces S5 and S6 opposing each other in a third direction (X direction), and first and second external electrodes 131 and 132 disposed on the fifth surface S5 and the sixth surface S6 of the ceramic body 110, respectively, and the first and second external electrodes 131 and 132 may include first and second conductive layers 131a and 132a disposed on corners of the ceramic body 110, and first and second base electrodes 131b and 132b covering the first and second conductive layers 131a and 132a, respectively.

When the first and second conductive layers 131a and 132a are disposed on corners of the ceramic body 110, respectively, the first and second conductive layers 131a and 132a may protect internal electrodes from external impacts.

To implement miniaturization and high capacitance of the multilayer ceramic electronic component and to secure capacitance, a structure in which an increased number of layers of internal electrodes are provided and the cover portion having a reduced thickness is provided may be applied. In this case, an internal electrode may be formed to a region adjacent to a corner of the ceramic body, the region having a reduced thickness when an external electrode is formed, such that the internal electrode may easily be exposed to physical and chemical impacts.

As an external electrode of the multilayer ceramic electronic component has been designed to have a reduced thickness, a thickness of the external electrode in a region adjacent to a corner of the ceramic body may further decrease such that corner coverage performance may degrade and a plating solution may permeate through the corner. Also, when glass is applied to the external electrode, the external electrode may be relatively vulnerable to acid resistance in a plating process. Due to the above-described properties, when a plating layer is formed on an external electrode, a plating solution may easily permeate into a ceramic body, which may reduce moisture resistance reliability and may degrade product quality. In the multilayer ceramic electronic component 100 in the exemplary embodiment, the first and second conductive layers 131a and 132a may be disposed on corners of the ceramic body 110, respectively, to prevent degradation of moisture resistance reliability caused by permeation of a plating solution and/or permeation of moisture.

According to the exemplary embodiment, a ratio ($A_1/A_2$) of an area $A_1$ of the first conductive layer 131a or the second conductive layer 132a disposed on the fifth surface S5 or the sixth surface S6 of the ceramic body 110 to an area $A_2$ of a cross-sectional surface of the ceramic body 110 taken in the second direction (Y direction) and the first direction (Z direction) may be in a range of 0.1 to 0.3.

The area $A_2$ of the cross-sectional surface of the ceramic body 110 taken in the second direction (Y direction) and the first direction (Z direction) may be a value obtained by multiplying a width of the ceramic body by a thickness thereof. For example, the value may be calculated by $(d+\alpha_W+d)\times(c+\alpha_T+c)$. Also, the area $A_1$ of the first conductive layer 131a or the second conductive layer 132a disposed on the fifth surface S5 or the sixth surface S6 of the ceramic body 110 may refer to an area of the first conductive layer 131a or the second conductive layer 132a covering the fifth surface S5 or the sixth surface S6, or an area of the first conductive layer 131a or the second conductive layer 132a disposed only on the fifth surface S5 or the sixth surface S6 of the ceramic body 110. Thus, the area $A_1$ of the first conductive layer 131a or the second conductive layer 132a disposed on the fifth surface S5 or the sixth surface S6 of the ceramic body 110 may refer to an area of the first conductive layer 131a or the second conductive layer 132a disposed on the surface of the ceramic body 110 in the second direction (Y direction) and the first direction (Z direction).

The multilayer ceramic electronic component 100 in the exemplary embodiment may have improved corner coverage properties by configuring the ratio $(A_1/A_2)$ of the area $A_1$ of the first conductive layer 131a or the second conductive layer 132a disposed on the fifth surface S5 or the sixth surface S6 of the ceramic body 110 to the area $A_2$ of the cross-sectional surface of the ceramic body 110 taken in the second direction (Y direction) and the first direction (Z direction) to be in the above-described range (e.g., 0.1 to 0.3).

In the exemplary embodiment, the ceramic body 110 may include the dielectric layer 111, the capacitance forming portion $\alpha_W$ and $\alpha_T$ including the first and second internal electrodes 121 and 122, the margin portion d disposed on each of both surfaces of the capacitance forming portion $\alpha_W$ and $\alpha_T$ in the second direction (Y direction), and the cover portion c disposed on each of both surfaces of the capacitance forming portion $\alpha_W$ and $\alpha_T$ in the first direction (Z direction).

A shape of the body 110 may not be limited to any particular shape, but as illustrated in the diagram, the body 110 may have a hexahedral shape or a shape similar to a hexahedron. Due to contraction of a ceramic powder included in the body 110 during a sintering process, the body 110 may have substantially a hexahedral shape although the hexahedral shape may not be an exact hexahedron formed by straight lines. The ceramic body 110 may have the first and second surfaces S1 and S2 opposing each other in a thickness direction (Z direction), the third and fourth surfaces S3 and S4 connected to the first and second surfaces S1 and S2 and opposing each other in a width direction (Y direction), and the fifth and sixth surfaces S5 and S6 connected to the first and second surfaces S1 and S2 and the third and fourth surfaces S3 and S4 and opposing each other in a length direction (X direction).

The ceramic body 110 may be formed by alternately layering a ceramic green sheet on which the first internal electrode 121 is printed on the dielectric layer 111 and a ceramic green sheet on which the second internal electrode 122 is printed on the dielectric layer 111 in the thickness direction (Z direction).

In the capacitance forming portion $\alpha_W$ and $\alpha_T$, the dielectric layer 111 and the first and second internal electrodes 121 and 122 may be alternately stacked. The plurality of the dielectric layers 111 included in the capacitance forming portion $\alpha_W$ and $\alpha_T$ may be in a sintered state, and a boundary between adjacent dielectric layers 111 may be integrated such that it may be difficult to identify the boundary without using a scanning electron microscope (SEM).

In the exemplary embodiment, a material of the dielectric layer 111 may not be limited to any particular material as long as sufficient capacitance can be obtained. For example, the dielectric layer 111 may be formed using a barium titanate material, a perovskite material compound with lead, a strontium titanate material, or the like.

Also, as the material of the dielectric layer 111, a barium titanate ($BaTiO_3$) powder, or the like, including various ceramic additives, organic solvents, coupling agents, dispersing agents, and the like, may be used depending on an intended purpose.

For example, the dielectric layer 111 may be formed by disposing a plurality of ceramic sheets formed by applying slurry including powder such as barium titanate ($BaTiO_3$) on a carrier film and drying the slurry. The ceramic sheet may be formed by manufacturing slurry formed from a mixture of a ceramic powder, a binder, and a solvent and manufacturing a sheet having a thickness of a several μm using the slurry through a doctor blade process, but an exemplary embodiment thereof is not limited thereto.

In the multilayer ceramic electronic component in the exemplary embodiment, the internal electrodes 121 and 122 may be alternately stacked to oppose each other with the dielectric layer 111 interposed therebetween. The internal electrodes 121 and 122 may include the first and second internal electrodes 121 and 122 alternately disposed to oppose each other with the dielectric layer 111 interposed therebetween.

The first internal electrode 121 may be exposed to one surface of the ceramic body 110 taken in the third direction (X direction), and a portion of the first internal electrode 121 exposed to the one surface taken in the third direction (X direction) may be connected to the first external electrode 131. The second internal electrode 122 may be exposed to the other surface of the ceramic body 110 taken in the third direction (X direction), and a portion of the second internal electrode 122 exposed to the other surface taken in the third direction (X direction) may be connected to the second external electrode 132. The first and second internal electrodes 121 and 122 may be electrically separated from each other by the dielectric layer 111 interposed therebetween.

A material of the first and second internal electrodes 121 and 122 may not be limited to any particular material, and may be formed using a conductive paste including one or more materials from among silver (Ag), palladium (Pd), nickel (Ni), gold (Au), platinum (Pt), copper (Cu), tin (Sn), tungsten (W), titanium (Ti), and alloys thereof. As a method of printing the conductive paste, a screen-printing method, a gravure printing method, or the like, may be used, but the printing method is not limited thereto.

In the multilayer ceramic electronic component, the margin portion d may be disposed on each of both surfaces of the capacitance forming portion $\alpha_W$ and $\alpha_T$ in the second direction. The margin portion d may be disposed on each of both surfaces of the capacitance forming portion $\alpha_W$ and $\alpha_T$ in the second direction (Y direction) perpendicular to the first and third directions (Z direction and X direction, respectively). The margin portion d may prevent damages to the internal electrode caused by physical or chemical stress.

The margin portion d may be formed of an insulating material, and may be formed of a ceramic material such as barium titanate, or the like. In this case, the margin portion d may include a ceramic material the same as a material included in the dielectric layer 111, or may be formed of a material the same as a material of the dielectric layer 111.

A method of forming the margin portion d is not limited any particular method. For example, the margin portion d may be formed by forming a margin region on a circumference portion other than a portion of the internal electrode connected to the external electrode by forming an area of the dielectric layer included in the capacitance forming portion $α_W$ to be greater than an area of the internal electrode, by applying slurry including ceramic, or by attaching a dielectric sheet on each of both surfaces of the capacitance forming portion $α_W$ in the second direction (Y direction).

The multilayer ceramic electronic component in the exemplary embodiment may include the cover portion c. The cover portion c may be disposed on an outermost region of the first and second internal electrodes 121 and 122. The cover portion c may be disposed on a lowermost internal electrode and on an uppermost internal electrode. In this case, the cover portion c may be formed of a composition the same as a composition of the dielectric layer 111, and may be formed by layering at least one or more dielectric layers on the uppermost internal electrode and the lowermost internal electrode. The cover portion c may prevent damage to the internal electrode caused by physical or chemical stress.

In the multilayer ceramic electronic component in the exemplary embodiment, the first external electrode 131 and the second external electrode 132 may be disposed on both surfaces of the ceramic body in the third direction (X direction). The first external electrode 131 may be electrically connected to the first internal electrode 121, and the second external electrode 132 may be electrically connected to the second internal electrode 122.

Figure 2:
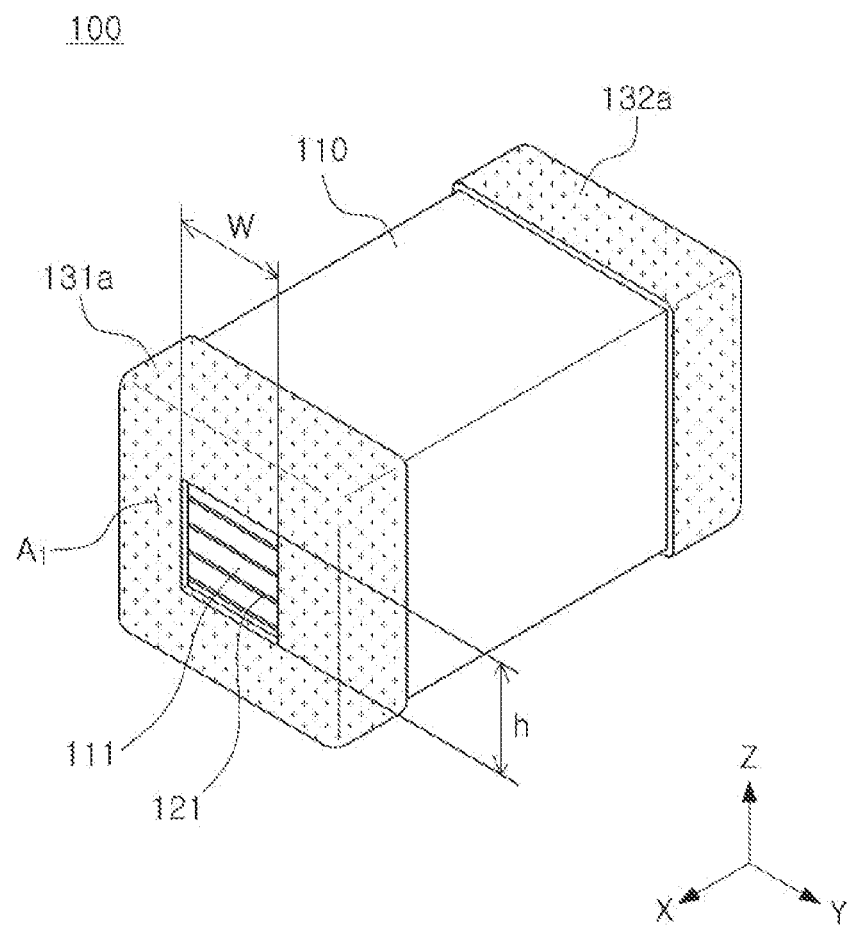
FIG. 2 is a perspective diagram illustrating a structure in which a conductive layer is disposed on a ceramic body of a multilayer ceramic electronic component according to an exemplary embodiment of the present disclosure.
Figure 3:
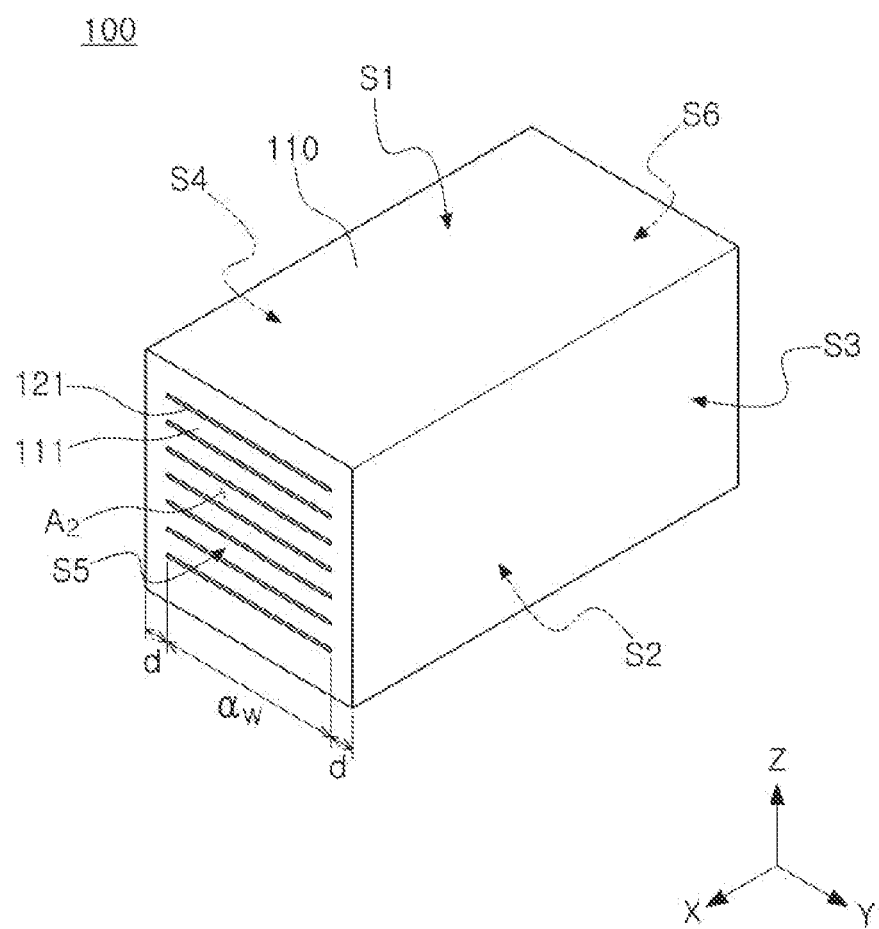
FIG. 3 is a perspective diagram illustrating a ceramic body of a multilayer ceramic electronic component according to an exemplary embodiment of the present disclosure.

The first and second external electrodes 131 and 132 may include the first and second conductive layers 131a and 132a disposed on corners of the ceramic body 110 and the first and second base electrodes 131b and 132b covering the first and second conductive layers 131a and 132a. FIG. 2 is a perspective diagram illustrating a structure in which only the first and second conductive layers 131a and 132a are disposed in the ceramic body 110. Referring to FIG. 2, the first conductive layer 131a may be disposed on a corner at which the fifth surface S5 meets the first to fourth surfaces (S1 to S4). Also, the second conductive layer 132a may be disposed on a corner at which the sixth surface S6 meets the first to fourth surfaces S1 to S4.

In an exemplary embodiment, the first conductive layer 131a may extend to the fifth surface S5 of the ceramic body 110 and the first to fourth surfaces S1 to S4 in contact with the fifth surface S5. Also, the second conductive layer 132a may extend to the sixth surface S6 of the ceramic body 110 and the first to fourth surfaces S1 to S4 in contact with the sixth surface S6. Referring to FIG. 2, the first conductive layer 131a may be disposed on a corner of the fifth surface S5 of the ceramic body 110, and may extend to the first to fourth surfaces S1 to S4 of the ceramic body 110. The second conductive layer 132a may be disposed on a corner of the sixth surface S6 of the ceramic body 110 and may extend to the first to fourth surfaces S1 to S4 of the ceramic body 110. Accordingly, when the first and second conductive layers 131a and 132a are configured to cover each corner of the multilayer ceramic electronic component 100, corners of the multilayer ceramic electronic component 100, vulnerable regions of the multilayer ceramic electronic component 100 may be protected.

As in the exemplary embodiment described above, when the first conductive layer 131a and the second conductive layer 132a extend to the first to fourth surfaces S1 to S4 of the ceramic body 110, and the first conductive layer 131a and the second conductive layer 132a are disposed excessively adjacent to each other, shorts may occur between the components. Thus, the first conductive layer 131a and the second conductive layer 132a may be configured to be spaced apart from each other. A spacing distance between the first conductive layer 131a and the second conductive layer 132a is not limited to any particular size. For example, the first conductive layer 131a and the second conductive layer 132a may be spaced apart from each other with a distance equal to or greater than $\frac{1}{20}$ times and less than 1 time a length of the ceramic body 110, but an exemplary embodiment thereof is not limited thereto.

In an exemplary embodiment, an end of the first conductive layer 131a disposed on the fifth surface S5 of the ceramic body 110 may be in contact with the first internal electrode 121. Also, an end of the second conductive layer 132a disposed on the sixth surface S6 of the ceramic body 110 may be in contact with the second internal electrode 122. The configuration in which the first and second conductive layers 131a and 132a are in contact with the first internal electrode 121 and the second internal electrode 122, respectively, may indicate that the first conductive layer 131a may be electrically connected to the first internal electrode 121 and that the second conductive layer 132a may be electrically connected to the second internal electrode 122. The configuration may indicate that a portion of the first internal electrode 121 exposed through the fifth surface S5 of the ceramic body 110 may be physically in contact with the first conductive layer 131a, and a portion of the second internal electrode 122 exposed through the sixth surface S6 of the ceramic body 110 may be physically in contact with the second conductive layer 132a.

Figure 4:
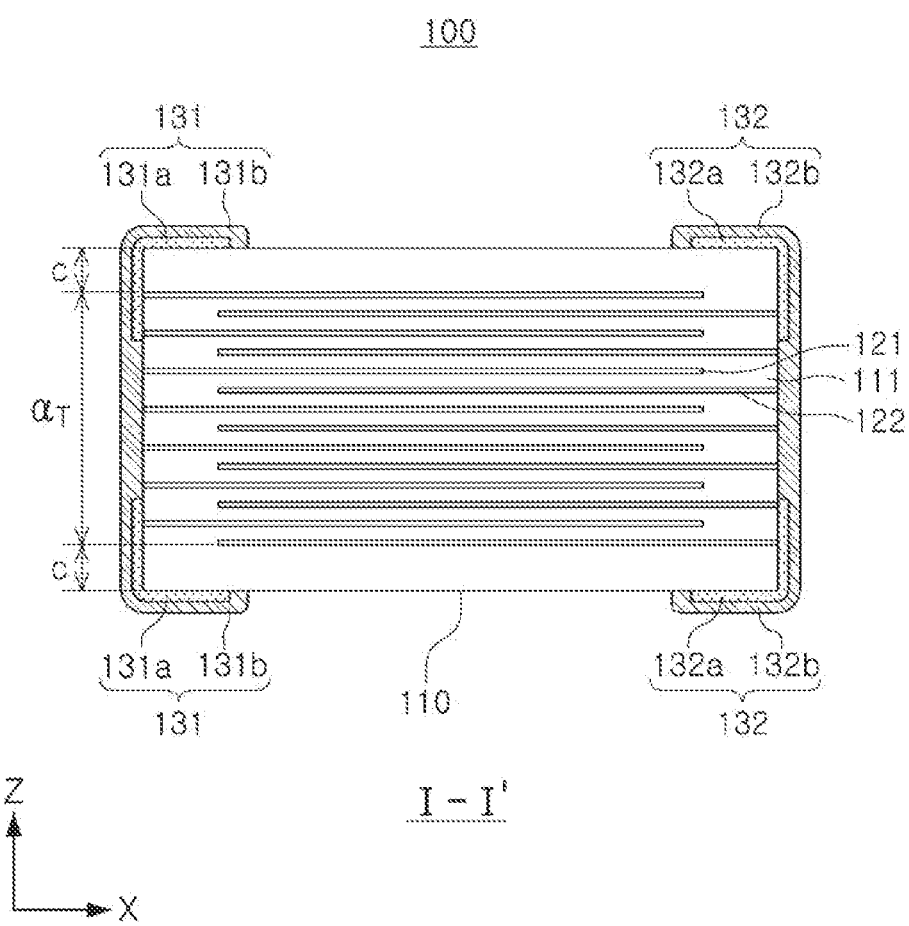
FIG. 4 is a cross-sectional diagram taken along line I-I' in FIG. 1.

Referring to FIG. 4, in the aforementioned exemplary embodiment, the first conductive layer 131a may be in contact with the first internal electrode 121 within the capacitance forming portion $α_T$. The second conductive layer 132a may be in contact with the second internal electrode 122 within the capacitance forming portion $α_T$. When moisture permeate into the multilayer ceramic electronic component 100, a region between the capacitance forming portion $α_T$ and the cover portion c may be a vulnerable point in terms of the structure of the multilayer ceramic electronic component 100. That is because a point at which outermost internal electrodes 121 and 122 meet the cover layer c may have the least mechanical strength due to a difference in sintering reduction rate between the dielectric layer 111 and the internal electrodes 121 and 122. In the multilayer ceramic electronic component 100 in the exemplary embodiment, the first conductive layer 131a and the second conductive layer 132a may be configured to be in contact with the first internal electrode 121 and the second internal electrode 122, respectively, such that corner coverage of the point at which the capacitance forming portion $α_T$ meets the cover portion c may improve, and accordingly, a moisture permeation route may be block in advance.

The first base electrode 131b and the second base electrode 132b of the multilayer ceramic electronic component 100 in the exemplary embodiment may cover the first conductive layer 131a and the second conductive layer 132a, respectively. The configuration in which the base electrodes 131b and 132b may cover the conductive layers 131a and 132a may indicate that the base electrodes 131b and 132b may be disposed such that the conductive layers 131a and 132a may not be externally exposed, and that the first conductive layer 131a and the second conductive layer 132a may be disposed in the first external electrode 131 and the second external electrode 132, respectively, such that only the first base electrode 131b and the second base electrode 132b may be visible from the outside.

In an exemplary embodiment, a central portion of the fifth surface S5 of the ceramic body 110 of the multilayer ceramic electronic component 100 may be in contact with the first base electrode 131b, and a central portion of the sixth surface S6 may be in contact with the second base electrode 132b. The configuration in which the fifth surface S5 of the ceramic body 110 may be in contact with the first base electrode 131b may indicate that the first conductive layer 131a may not be disposed on the central portion of the fifth surface S5 of the ceramic body 110, and the configuration in which the sixth surface S6 of the ceramic body 110 may be in contact with the second base electrode 132b may indicate the structure in which the second conductive layer 132a may not be disposed on a central portion of the sixth surface S6 of the ceramic body 110. In the exemplary embodiment, the first conductive layer 131a and the second conductive layer 132a may be disposed on corners of the ceramic body 110, the first base electrode 131b may cover the first conductive layer 131a, and the second base electrode 132b may cover the second conductive layer 132a such that moisture resistance reliability may improve, electrical conductivity may be maintained, and performance of the multilayer ceramic electronic component may be maintained.

Figure 5:
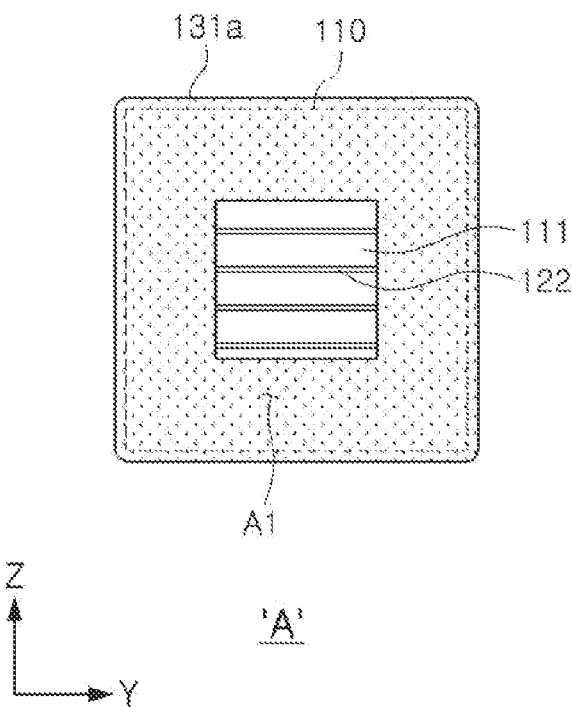
FIGS. 5 and 6 are diagrams illustrating a multilayer ceramic electronic component, viewed in an A direction, according to an exemplary embodiment of the present disclosure.
Figure 6:
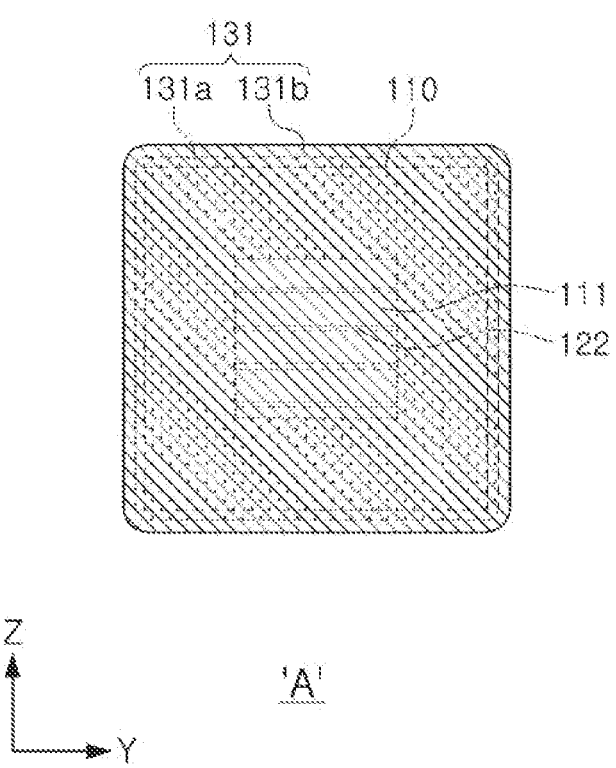

FIGS. 5 to 8 are diagrams illustrating a multilayer ceramic electronic component 100 illustrated in FIG. 1, viewed in an A direction. Referring to FIGS. 5 and 6, in an exemplary embodiment, each of regions of the first and second base electrodes 131b and 132b in which the first and second conductive layers 131a and 132a are not disposed in the third direction (X direction) in the ceramic body 110 may have a quadrangular shape. When each of the regions of the first and second base electrodes 131b and 132b in which the first and second conductive layers 131a and 132a are not disposed has a quadrangular shape, an area of external electrode corner coverage may be uniformly formed such that an effect of preventing a plating solution from permeating may improve.

In one exemplary embodiment, a maximum width (w) in the Y direction and a maximum height (h) in the Z direction of an area of each of the first and second base electrodes, on which the first and second conductive layers are not disposed in the third direction, may be less than a maximum width in the Y direction and a maximum height ($\alpha_T$) in the Z direction of the capacitance forming portion, respectively. Such widths and heights may be may be measured by a standard method that will be apparent to and understood by one of ordinary skill in the art.

Figure 7:
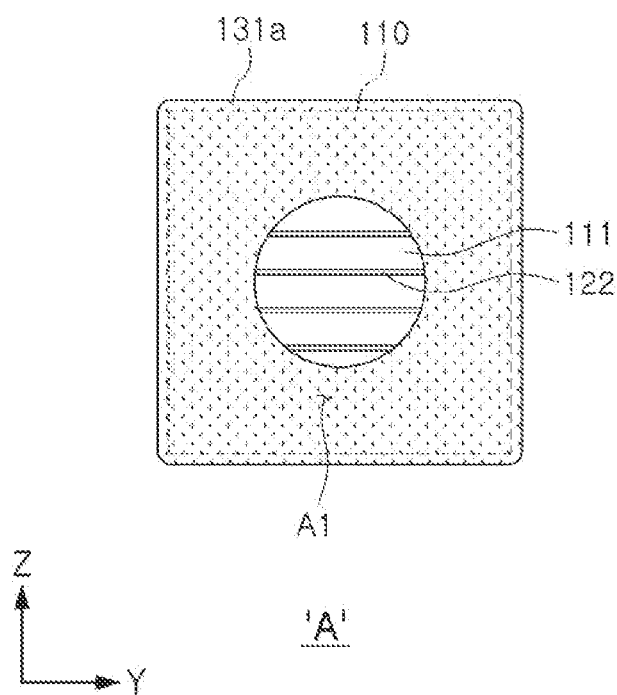
FIGS. 7 and 8 are diagrams illustrating a multilayer ceramic electronic component, viewed in an A direction, according to another exemplary embodiment of the present disclosure.
Figure 8:
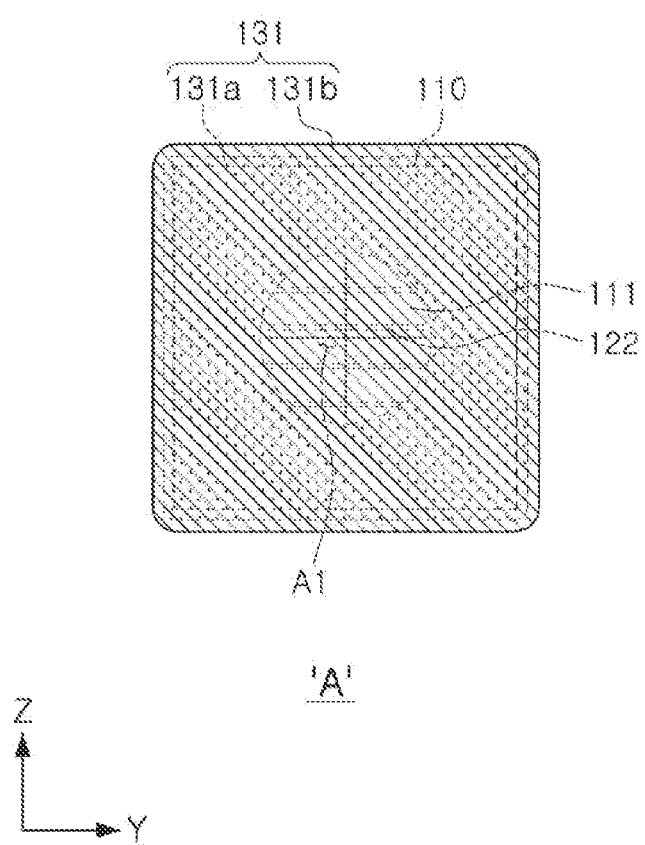

Referring to FIGS. 7 and 8, in the multilayer ceramic electronic component 100 in another exemplary embodiment, each of regions of the first and second base electrodes 131b and 132b in which the first and second conductive layers 131a and 132a are not disposed in the third direction (X direction) in the ceramic body 110 may have a circular shape. When each of the regions of the first and second base electrodes 131b and 132b in which the first and second conductive layers 131a and 132a are not disposed has a circular shape, a moisture permeation route may be reduced such that an effect of preventing a plating solution from permeating may improve.

In an exemplary embodiment, the first conductive layer 131a, the second conductive layer 132a, the first base electrode 131b, and the second base electrode 132b may include the same conductive metal. As in the exemplary embodiment, when the first conductive layer 131a, the second conductive layer 132a, the first base electrode 131b, and the second base electrode 132b include the same conductive metal, cohesion properties between the conductive layer and the base electrode may improve such that permeation of moisture may be prevented effectively.

In another exemplary embodiment, the first conductive layer 131a, the second conductive layer 132a, the first base electrode 131b, and the second base electrode 132b may include a conductive metal, and an average particle size of a conductive metal included in the first and second base electrodes 131b and 132b may be greater than an average particle size of a conductive metal included in the first and second conductive layers 131a and 132a. An average particle size of the conductive metal may refer to a particle size of D50, and may be measured using a particle size analyzer such as SALD-7101 of Shimadzu. When an average particle size of a conductive metal included in the first and second conductive layers 131a and 132a is less than an average particle size of a conductive metal included in the first and second base electrodes 131b and 132b, the first conductive layer 131a and the second conductive layer 132a may have a more cohesive structure such that performance of preventing moisture permeation may be improved. Also, cohesiveness between the first and second conductive layers 131a and 132a and the first and second base electrodes 131b and 132b may increase such that moisture resistance reliability may be improved.

In an exemplary embodiment, the first conductive layer 131a, the second conductive layer 132a, the first base electrode 131b, and the second base electrode 132b may include copper (Cu). The first conductive layer 131a, the second conductive layer 132a, the first base electrode 131b, and the second base electrode 132b may include copper (Cu) the most, but an exemplary embodiment thereof is not limited thereto. For example, the first conductive layer 131a, the second conductive layer 132a, the first base electrode 131b, and the second base electrode 132b may be formed using conductive paste including one or more materials from among nickel (Ni), tin (Sn), palladium (Pd), platinum (Pt), gold (Au), silver (Ag), tungsten (W), titanium (Ti), lead (Pb), and alloys thereof and glass.

A method of forming the first conductive layer 131a, the second conductive layer 132a, the first base electrode 131b, and the second base electrode 132b may not be limited to any particular method. For example, the first conductive layer 131a, the second conductive layer 132a, the first base electrode 131b, and the second base electrode 132b may be formed by dipping the ceramic body in the conductive paste including a conductive metal and glass, by printing the conductive paste on a surface of the ceramic body by a screen printing method or a gravure printing method, by applying the conductive paste on a surface of the ceramic body, or by transcribing a dried film formed by drying the conductive paste on the ceramic body, but an example of the method is not limited thereto. As the first conductive layer 131a, the second conductive layer 132a, the first base electrode 131b, and the second base electrode 132b are formed using the conductive paste described above, sufficient conductivity may be maintained, and cohesiveness of the external electrode may increase due to the added glass such that permeation of a plating solution and/or moisture may be prevented effectively.

A glass composition included in the first conductive layer 131a, the second conductive layer 132a, the first base electrode 131b, and the second base electrode 132b may include a mixture of various oxides, and may include one or more selected from a group consisting of silicon oxide, boron oxide, aluminum oxide, transition metal oxide, alkaline metal oxide, and alkaline earth metal oxide. Transition metal may be selected from a group consisting of zinc (Zn), titanium (Ti), copper (Cu), vanadium (V), manganese (Mn), iron (Fe), and nickel (Ni), alkaline metal may be selected from a group consisting of lithium (Li), natrium (Na), and kalium (K), and alkaline earth metal may be selected from a group consisting of magnesium (Mg), calcium (Ca), strontium (Sr), and barium (Ba).

Figure 9:
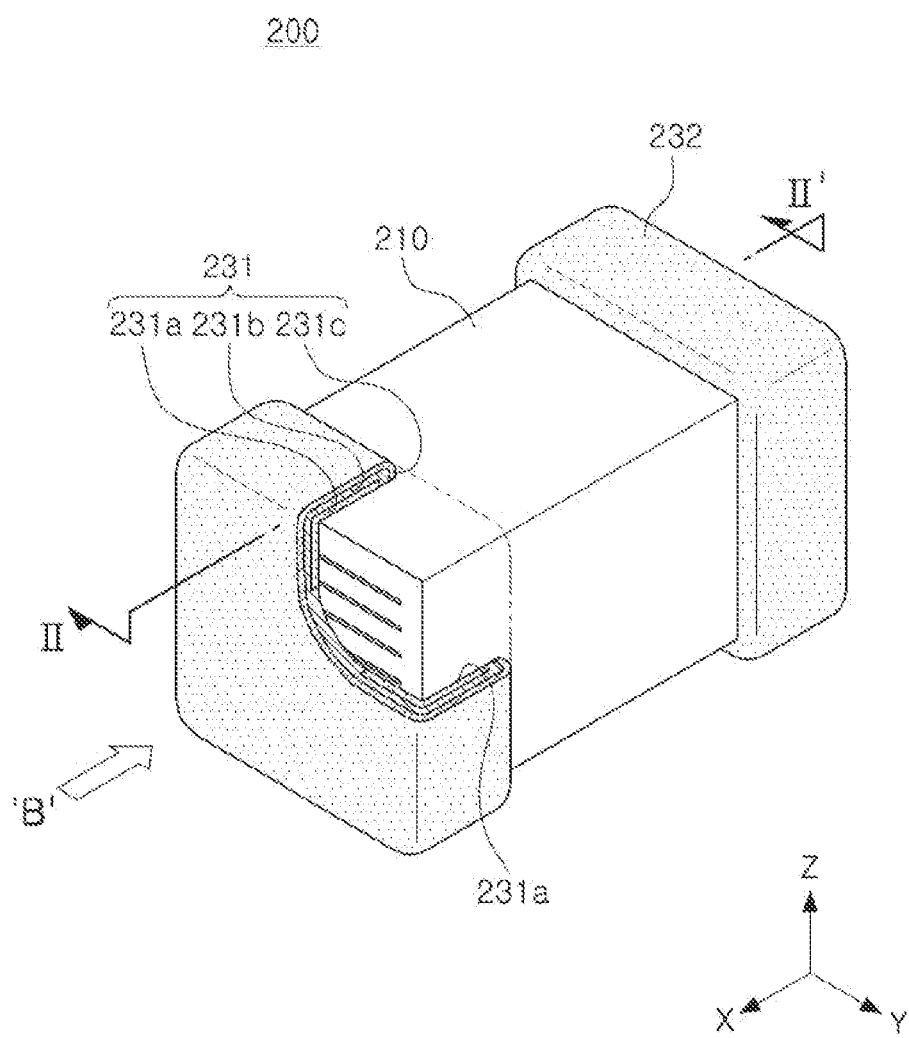
FIG. 9 is a perspective diagram illustrating a multilayer ceramic electronic component according to another exemplary embodiment of the present disclosure.
Figure 10:
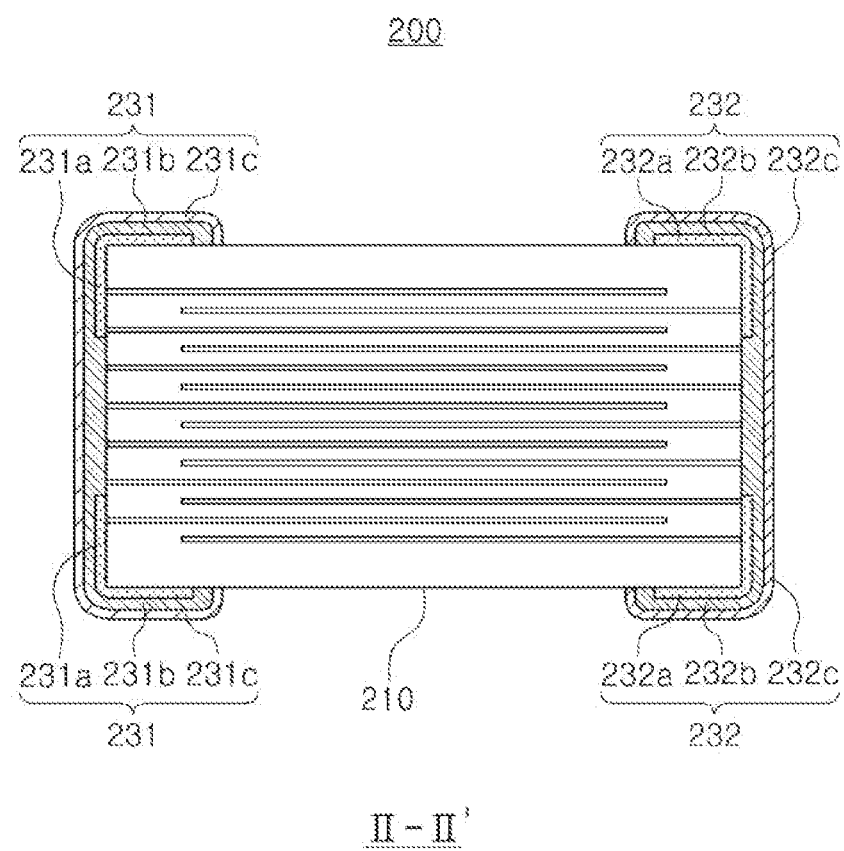
FIG. 10 is a cross-sectional diagram taken along line II-II' in FIG. 9.
Figure 11:
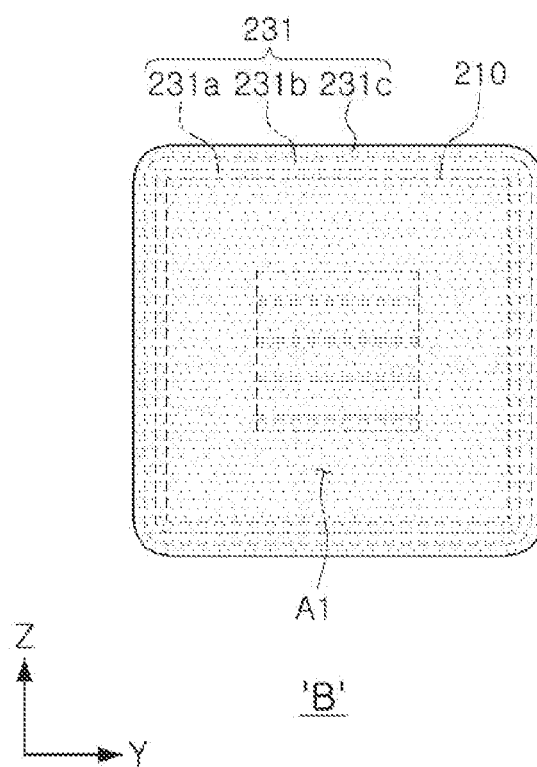
FIG. 11 is a diagram illustrating a multilayer ceramic electronic component, viewed in a B direction, according to an exemplary embodiment of the present disclosure.
Figure 12:
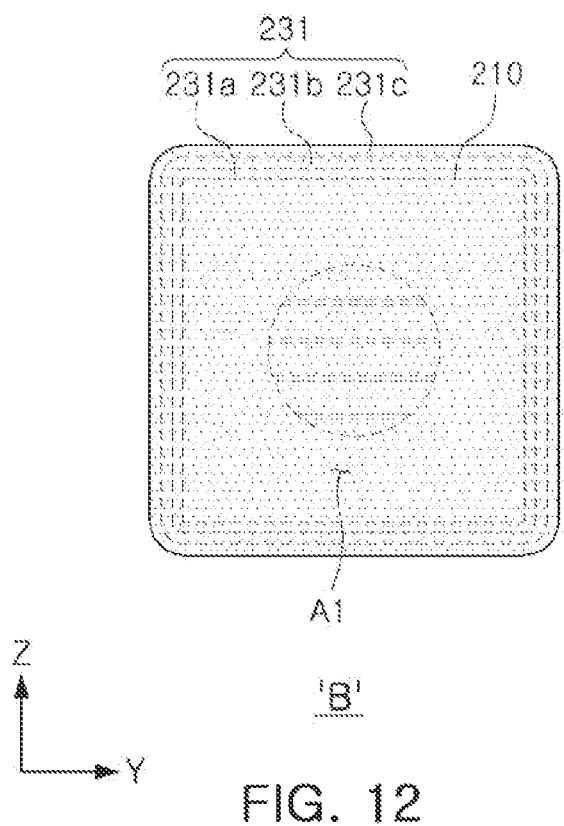
FIG. 12 is a diagram illustrating a multilayer ceramic electronic component, viewed in a B direction, according to another exemplary embodiment of the present disclosure.

In an another exemplary embodiment, a multilayer ceramic electronic component may include a first terminal electrode 231c disposed on the first base electrode 131b and a second terminal electrode 232c disposed on the second base electrode 132b. FIG. 9 is a perspective diagram illustrating a multilayer ceramic electronic component 200 according to an exemplary embodiment, and FIG. 10 is a cross-sectional diagram taken along line II-II' in FIG. 9. Referring to FIG. and 10, the first terminal electrode 231c of a first external electrode 231 and the second terminal electrode 232c of a second external electrode 232 may cover a first base electrode 231b and a second base electrode 232b, respectively. The first base electrode 231b and the second base electrode 232b may cover a first conductive layer 231a and a second conductive layer 232a, respectively, which are disposed on corners of a ceramic body 210.

In an exemplary embodiment, the first and second terminal electrodes 231c and 232c may be formed by a plating process. The first and second terminal electrodes 231c and 232c may be formed by a sputtering process or an electric deposition process, but an exemplary embodiment thereof is not limited thereto.

The first and second terminal electrodes 231c and 232c may include nickel (Ni) the most, but an exemplary embodiment thereof is not limited thereto. The first and second terminal electrodes 231c and 232c may include nickel (Ni), tin (Sn), copper (Cu), palladium (Pd), platinum (Pt), gold (Au), silver (Ag), tungsten (W), titanium (Ti), lead (Pb), and alloys thereof. By including the first and second terminal electrodes 231c and 232c, mounting properties with a substrate, structural reliability, durability against external impacts, heat resistance properties and/or an equivalent series resistance (ESR) value may improve.

Table 1 below relates to a thickness of the external electrode of a corner of the ceramic body based on whether the first and second conductive layers are applied and according to a ratio of an area of the first and second conductive layers ($A_1$) to an area of a cross-sectional surface of the ceramic body ($A_2$). The thicknesses and areas described in the Table 1 may be may be measured or calculated by a standard method that will be apparent to and understood by one of ordinary skill in the art.

TABLE 1

| Classification | Whether Conductive Layer is disposed | Ratio of Conductive Layer Area (%), $A_1/A_2$ | Thickness of External Electrode Disposed on Corner (μm) | Thickness of External Electrode (μm) |
|---|---|---|---|---|
| Comparative Example 1 | x | 0 | 7 | 290 |
| Embodiment 1 | ○ | 10 | 15 | 296 |
| Embodiment 2 |  | 20 | 22 | 299 |
| Embodiment 3 |  | 30 | 25 | 323 |
| Comparative Example 2 |  | 40 | 26 | 380 |

As indicated in Table 1, as compared to comparative example 1 in which the first and second conductive layers are not disposed, in embodiments 1 to 3, the thickness of the external electrode disposed on the corner of the ceramic body may be increased without affecting a thickness of the external electrode. Also, when an area of the conductive layer exceeds 30%, an overall thickness of the external electrode may greatly increase such that it may be difficult to reduce a size of the component.

According to the aforementioned exemplary embodiments, the multilayer ceramic electronic component which may improve corner coverage performance of the external electrode may be provided.

Also, the multilayer ceramic electronic component having improved moisture resistance reliability may be provided.

Further, the multilayer ceramic electronic component in which a moisture permeation route may be blocked and a band portion of the external electrode may have a reduced thickness may be provided.

While the exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
a capacitance forming portion including a plurality of dielectric layers and a plurality of first and second internal electrodes alternately stacked in a first direction with each dielectric layer interposed between the respective first and second internal electrodes;
a ceramic body having first and second surfaces opposing each other in the first direction, third and fourth surfaces opposing each other in the second direction, and fifth and sixth surfaces opposing each other in a third direction;
a margin portion disposed on two surfaces of the capacitance forming portion opposing each other in the second direction;
a cover portion disposed on two other surfaces of the capacitance forming portion opposing each other in the first direction; and
first and second external electrodes disposed on the fifth and sixth surfaces of the ceramic body, respectively, wherein the first and second external electrodes respectively include first and second conductive layers disposed on corners of the ceramic body, and first and second base electrodes covering the first and second conductive layers, respectively, wherein central portions of the fifth and sixth surfaces of the ceramic body are in direct contact with the first and second base electrodes, respectively, wherein the first conductive layer is in direct contact with both uppermost and lowermost electrodes of the first internal electrodes, and wherein the second conductive layer is in direct contact with both uppermost and lowermost electrodes of the second internal electrodes.

2. The multilayer ceramic electronic component of claim 1, wherein the first conductive layer extends onto the fifth surface of the ceramic body and the first to fourth surfaces in contact with the fifth surface of the ceramic body, and wherein the second conductive layer extends onto the sixth surface of the ceramic body and the first to fourth surfaces in contact with the sixth surface of the ceramic body.

3. The multilayer ceramic electronic component of claim 1, wherein the first and second conductive layers extending to the first to fourth surfaces of the ceramic body are spaced apart from each other.

4. The multilayer ceramic electronic component of claim 1, wherein ends of the first and second conductive layers disposed on the fifth and sixth surfaces of the ceramic body, respectively, are in contact with at least one of the first internal electrodes or at least one of the second internal electrodes.

5. The multilayer ceramic electronic component of claim 1, wherein a ratio, $A_1/A_2$, of an area, $A_1$, of the first conductive layer disposed on the fifth surface of the ceramic body or the second conductive layer disposed on the sixth surface of the ceramic body to an area, $A_2$, of a cross-sectional surface of the ceramic body taken in the second direction and the first direction is in a range of 0.1 to 0.3.

6. The multilayer ceramic electronic component of claim 1, wherein an area of each of the first and second base electrodes on which the first and second conductive layers are not disposed in the third direction in the ceramic body has a quadrangular shape.

7. The multilayer ceramic electronic component of claim 1, wherein an area of each of the first and second base electrodes on which the first and second conductive layers are not disposed in the third direction in the ceramic body has a circular shape.

8. The multilayer ceramic electronic component of claim 1, wherein the first conductive layer, the second conductive layer, the first base electrode, and the second base electrode include a same conductive metal.

9. The multilayer ceramic electronic component of claim 1, wherein the first conductive layer, the second conductive layer, the first base electrode, and the second base electrode include a conductive metal, and wherein an average particle size of the conductive metal included in the first and second base electrodes is greater than an average particle size of the conductive metal included in the first and second conductive layers.

10. The multilayer ceramic electronic component of claim 1, wherein the first conductive layer, the second conductive layer, the first base electrode, and the second base electrode include copper.

11. The multilayer ceramic electronic component of claim 1, further comprising:

first and second terminal electrodes covering the first and second base electrodes.

12. The multilayer ceramic electronic component of claim 1, wherein a maximum width in the second direction and a maximum height in the first direction of an area of each of the first and second base electrodes, on which the first and second conductive layers are not disposed, are less than a maximum width in the second direction and a maximum height of the capacitance forming portion in the first direction, respectively.

13. A multilayer ceramic electronic component, comprising:

a capacitance forming portion including a plurality of dielectric layers and a plurality of first and second internal electrodes alternately stacked in a first direction with each dielectric layer interposed between the respective first and second internal electrodes;

a ceramic body having first and second surfaces opposing each other in the first direction, third and fourth surfaces opposing each other in a second direction, and fifth and sixth surfaces opposing each other in a third direction; and first and second external electrodes disposed on the fifth and sixth surfaces of the ceramic body, respectively, wherein the first and second external electrodes respectively include first and second conductive layers disposed on the fifth and sixth surfaces of the ceramic body and extending in the third direction onto the first to fourth surfaces of the ceramic body, the first and second conductive layers each including an opening on the fifth surface or the sixth surface of the ceramic body penetrating therethrough, wherein the first and second external electrodes further include first and second base electrodes covering the first and second conductive layers, wherein a central portion of the fifth surface of the ceramic body is in direct contact with the first base electrode, and wherein ends of the first conductive layer disposed on the fifth surface of the ceramic body are in direct contact with both uppermost and lowermost electrodes of the first internal electrodes.

14. The multilayer ceramic electronic component of claim 13, further comprising:

a margin portion disposed on two surfaces of the capacitance forming portion opposing each other in the second direction; and a cover portion disposed on two other surfaces of the capacitance forming portion opposing each other in the first direction.

15. The multilayer ceramic electronic component of claim 13, wherein the first and second conductive layers extending to the first to fourth surfaces of the ceramic body are spaced apart from each other.

16. The multilayer ceramic electronic component of claim 13, wherein a ratio, $A_1/A_2$, of an area, $A_1$, of the first conductive layer disposed on the fifth surface of the ceramic body or the second conductive layer disposed on the sixth surface of the ceramic body to an area, $A_2$, of a cross-sectional surface of the ceramic body taken in the second direction and the first direction is in a range of 0.1 to 0.3.

17. The multilayer ceramic electronic component of claim 13, wherein an area of each of the first and second base electrodes on which the first and second conductive layers are not disposed in the third direction in the ceramic body has a quadrangular shape.

18. The multilayer ceramic electronic component of claim 13, wherein an area of each of the first and second base electrodes on which the first and second conductive layers are not disposed in the third direction in the ceramic body has a circular shape.

19. The multilayer ceramic electronic component of claim 13,
- wherein the first conductive layer, the second conductive layer, the first base electrode, and the second base electrode include a conductive metal, and
- wherein an average particle size of the conductive metal included in the first and second base electrodes is greater than an average particle size of the conductive metal included in the first and second conductive layers.

20. The multilayer ceramic electronic component of claim 13, wherein the first conductive layer, the second conductive layer, the first base electrode, and the second base electrode include copper.

* * * * *